US012771021B2

(12) United States Patent
Mesquita et al.

(10) Patent No.: US 12,771,021 B2
(45) Date of Patent: Oct. 20, 2026

(54) ANTENNA ARRAY WITH RECONFIGURABLE ANTENNA ARRAY GEOMETRY

(71) Applicant: Telefonaktiebolaget LM Ericsson (publ), Stockholm (SE)

(72) Inventors: Fabien Mesquita, Limhamn (SE); Stefan Andersson, Flyinge (SE); Fredrik Tillman, Lund (SE)

(73) Assignee: Telefonaktiebolaget LM Ericsson (Publ), Stockholm (SE)

(*) Notice: Subject to any disclaimer, the term of this patent is extended or adjusted under 35 U.S.C. 154(b) by 128 days.

(21) Appl. No.: 18/264,118

(22) PCT Filed: Feb. 4, 2021

(86) PCT No.: PCT/SE2021/050078
§ 371 (c)(1),
(2) Date: Aug. 3, 2023

(87) PCT Pub. No.: WO2022/169386
PCT Pub. Date: Aug. 11, 2022

(65) Prior Publication Data
US 2024/0313396 A1 Sep. 19, 2024

(51) Int. Cl.
*H01Q 3/24* (2006.01)
*H01Q 21/06* (2006.01)
(Continued)

(52) U.S. Cl.
CPC ............. *H01Q 3/24* (2013.01); *H01Q 21/061* (2013.01); *H04B 7/0691* (2013.01); *H04B 7/0874* (2013.01)

(58) Field of Classification Search
CPC .......... H01Q 3/24; H01Q 3/36; H01Q 21/061; H01Q 25/00; H01Q 25/002; H04B 7/02; H04B 7/0691; H04B 7/0874; H04W 16/28
See application file for complete search history.

(56) References Cited

U.S. PATENT DOCUMENTS 6,188,373 B1 * 2/2001 Martek ................ H01Q 21/205
343/893
7,081,847 B2 7/2006 Ziller et al.
(Continued)

OTHER PUBLICATIONS

International Search Report and Written Opinion dated Oct. 21, 2021 for International Application No. PCT/SE2021/050078 filed Feb. 4, 2021, consisting of 13—pages.
(Continued)

*Primary Examiner* — Jason M Crawford
(74) *Attorney, Agent, or Firm* — Weisberg I.P. Law, P.A.

(57) ABSTRACT

Mechanisms for operating an antenna array. The antenna array includes antenna elements and having a reconfigurable antenna array geometry. A method includes applying, as part of operating the antenna array for performing wireless communication, at least two antenna array geometries at the antenna array. The at least two antenna array geometries are alternatingly applied when the antenna array is operated. Each of the at least two antenna array geometries has a respective radiation pattern having a main lobe and a set of side lobes. The main lobes of all the radiation patterns have same pointing direction. Pointing directions of the side lobes differ between the radiation patterns of the at least two antenna array geometries.

18 Claims, 8 Drawing Sheets

□ : Active element in 1st antenna geometry
■ : Inactive element in 1st antenna geometry □ : Active element in 2nd antenna geometry
■ : Inactive element in 2nd antenna geometry

(51) Int. Cl.

| | |
|---|---|
| ***H04B 7/06*** | (2006.01) |
| ***H04B 7/08*** | (2006.01) |

(56) References Cited

U.S. PATENT DOCUMENTS

| | | | | |
|---|---|---|---|---|
| 10,433,260 | B1 | 10/2019 | Krishnamachari et al. | |
| 11,329,399 | B2 * | 5/2022 | Petersson | H01Q 21/061 |
| 2011/0102263 | A1 * | 5/2011 | Angeletti | H01Q 3/40 342/373 |
| 2016/0219567 | A1 * | 7/2016 | Gil | H04B 7/0491 |
| 2018/0198204 | A1 * | 7/2018 | Kovacic | H04W 52/367 |
| 2019/0372630 | A1 * | 12/2019 | Brunel | H04B 7/0695 |
| 2020/0068415 | A1 | 2/2020 | Lee et al. | |
| 2021/0136598 | A1 * | 5/2021 | Raghavan | H04B 7/0691 |
| 2021/0226681 | A1 * | 7/2021 | Raghavan | H04B 7/0617 |
| 2022/0224382 | A1 * | 7/2022 | Brunel | H04B 7/0695 |
| 2022/0271425 | A1 * | 8/2022 | Kilpatrick | H01Q 21/065 |
| 2024/0313396 | A1 * | 9/2024 | Mesquita | H01Q 3/36 |

OTHER PUBLICATIONS

W. H. Kummer et al.; Ultra-Low Sidelobes from Time-Modulated Arrays; IEEE Transactions on Antennas and Propagation; vol. 11, No. 6; Nov. 1963, consisting of 7—pages.

A. Paidimarri et al.; Spatio-Temporal Filtering: Precise Beam Control Using Fast Beam Switching; 2020 IEEE Radio Frequency Integrated Circuits Symposium; 2020, consisting of 4—pages.

3GPP TR 37.941 V16.2.0; 3rd Generation Partnership Project; Technical Specification Group Radio Access Network; Radio Frequency (RF) conformance testing background for radiated Base Station (BS) requirements (Release 16); Dec. 2020, consisting of 328—pages.

Y. Ju et al.; Safeguarding Millimeter Wave Communications Against Randomly Located Eavesdroppers; arXiv; Jan. 29, 2018, consisting of 14—pages.

European Communication under Rule 71(3) EPC dated Apr. 1, 2025 for Application No. 21705285.1, consisting of 7 pages.

* cited by examiner

□ : Active element in 2nd antenna geometry
■ : Inactive element in 2nd antenna geometry □ : Active element in 1st and 2nd antenna geometries
▧ : Active element only in 1st antenna geometry
▨ : Active element only in 2nd antenna geometry □ : Active element ■ : Inactive element

ANTENNA ARRAY WITH RECONFIGURABLE ANTENNA ARRAY GEOMETRY

CROSS-REFERENCE TO RELATED APPLICATIONS

This application is a Submission Under 35 U.S.C. § 371 for U.S. National Stage Patent Application of International Application Number: PCT/SE2021/050078, filed Feb. 4, 2021 entitled "ANTENNA ARRAY WITH RECONFIGURABLE ANTENNA ARRAY GEOMETRY," the entirety of which is incorporated herein by reference.

TECHNICAL FIELD

Embodiments presented herein relate to a method, a controller, a computer program, and a computer program product for operating an antenna array.

BACKGROUND

In general terms, in electromagnetics, directivity is a parameter of an antenna that measures the degree to which the radiation emitted is concentrated in a single direction. The directivity measures, or represents, the power density the antenna radiates in the direction of its strongest emission, versus the power density radiated by an ideal isotropic radiator (which emits uniformly in all directions) radiating the same total power. Phased antenna array systems rely on constructive interference from several isotropic antenna elements to increase the directivity. The energy beam is steered by adjusting the delay (as adjustable by phase weights or true time delays) in each branch of the antenna array.

The field strength obtained in the wanted direction is commonly referred to as the main lobe (or main beam). The antenna array is also radiating in unwanted directions, and these are indicated as side lobes. FIG. 1 illustrates an example radiation pattern identifying the main lobe and side lobes. In the case where the antenna array is transmitting, the side lobes are considered as a waste of energy and may cause interfere to other radio transceiver devices. In the case where the antenna array is receiving, the side lobes might catch unwanted interfering signals, causing the noise level in the receiver to increase. The side lobe level (SLL) is defined as the amplitude difference between the main lobe and the side lobe with highest energy. For the reasons just explained, the side lobes should have as little energy as possible, thus resulting in a high amplitude difference between the main lobe and the side lobes. A high amplitude difference corresponds to a low SLL.

In order to reduce the SLL, one technique is to apply amplitude tapering or amplitude weighting. Amplitude tapering or amplitude weighting involves applying amplitude weights to the excitation of each antenna element. In one example, as illustrated in FIG. 2 where amplitude tapering is applied to a 1-by-8 elements antenna array, highest excitation is allowed for antenna elements in the center of the antenna array and a higher level of tapering at the antenna elements at the edges of the antenna array. FIG. 2 shows four different tapering windows. FIG. 3 and FIG. 4 show the resulting SLL and amplitude of the main lobe for the four different tapering windows of FIG. 2. As seen in FIG. 3, with the tapering applied according to FIG. 2, the SLL is reduced. However, as shown in FIG. 4, this also results in a reduction of the main lobe amplitude. This means that the number of active antenna branches has to be increased when tapering is applied in order to yield a constant directivity. This results in an increasing total power consumption. Furthermore, amplitude tapering requires extra gain control circuitry in the transceiver, possibly with fine amplitude resolution. In turn, this results in an increased complexity of the transceiver. Still further, tapering efficiency is limited by multiple impairments, e.g. phase resolution and errors, active antenna match and antenna calibration inaccuracy.

Hence, there is still a need for improved techniques for reducing the SLL of an antenna array.

SUMMARY

An object of embodiments herein is to address the above identified issues by providing a method, a controller, a computer program, and a computer program product that enable efficient reduction of the SLL.

According to a first aspect there is presented a method for operating an antenna array. The antenna array comprises antenna elements and having a reconfigurable antenna array geometry. The method comprises applying, as part of operating the antenna array for performing wireless communication, at least two antenna array geometries at the antenna array. The at least two antenna array geometries are alternatingly applied when the antenna array is operated. Each of the at least two antenna array geometries has a respective radiation pattern having a main lobe and a set of side lobes. The main lobes of all the radiation patterns have same pointing direction. Pointing directions of the side lobes differ between the radiation patterns of the at least two antenna array geometries.

According to a second aspect there is presented a controller for operating an antenna array. The antenna array comprises antenna elements and having a reconfigurable antenna array geometry. The controller comprises processing circuitry. The processing circuitry being configured to cause the controller to apply, as part of operating the antenna array for performing wireless communication, at least two antenna array geometries at the antenna array. The at least two antenna array geometries are alternatingly applied when the antenna array is operated. Each of the at least two antenna array geometries has a respective radiation pattern having a main lobe and a set of side lobes. The main lobes of all the radiation patterns have same pointing direction. Pointing directions of the side lobes differ between the radiation patterns of the at least two antenna array geometries.

According to a third aspect there is presented a controller for operating an antenna array. The antenna array comprises antenna elements and having a reconfigurable antenna array geometry. The controller comprises an apply module configured to apply, as part of operating the antenna array for performing wireless communication, at least two antenna array geometries at the antenna array. The at least two antenna array geometries are alternatingly applied when the antenna array is operated. Each of the at least two antenna array geometries has a respective radiation pattern having a main lobe and a set of side lobes. The main lobes of all the radiation patterns have same pointing direction. Pointing directions of the side lobes differ between the radiation patterns of the at least two antenna array geometries.

According to a fourth aspect there is presented a computer program for operating an antenna array, the computer program comprises computer program code which, when run on a controller, causes the controller to perform a method according to the first aspect.

According to a fifth aspect there is presented a computer program product comprises a computer program according to the fourth aspect and a computer readable storage medium on which the computer program is stored. The computer readable storage medium could be a non-transitory computer readable storage medium.

Advantageously, these aspects efficiently reduce the SLL over time.

Advantageously, these aspects enable the side lobes to be smeared out in different directions over time and thereby results in a reduction of the average SLL over time.

Advantageously, these aspects do not require implementation of complex elements in the transceiver such as a fine resolution variable gain amplifier.

Advantageously, these aspects allow the number of active antenna elements to be kept constant for all antenna array geometries, thus not impacting the power consumption of the antenna array.

Other objectives, features and advantages of the enclosed embodiments will be apparent from the following detailed disclosure, from the attached dependent claims as well as from the drawings.

Generally, all terms used in the claims are to be interpreted according to their ordinary meaning in the technical field, unless explicitly defined otherwise herein. All references to "a/an/the element, apparatus, component, means, module, step, etc." are to be interpreted openly as referring to at least one instance of the element, apparatus, component, means, module, step, etc., unless explicitly stated otherwise. The steps of any method disclosed herein do not have to be performed in the exact order disclosed, unless explicitly stated.

BRIEF DESCRIPTION OF THE DRAWINGS

The inventive concept is now described, by way of example, with reference to the accompanying drawings, in which.

DETAILED DESCRIPTION

The inventive concept will now be described more fully hereinafter with reference to the accompanying drawings, in which certain embodiments of the inventive concept are shown. This inventive concept may, however, be embodied in many different forms and should not be construed as limited to the embodiments set forth herein; rather, these embodiments are provided by way of example so that this disclosure will be thorough and complete, and will fully convey the scope of the inventive concept to those skilled in the art. Like numbers refer to like elements throughout the description. Any step or feature illustrated by dashed lines should be regarded as optional.

Figure 1:
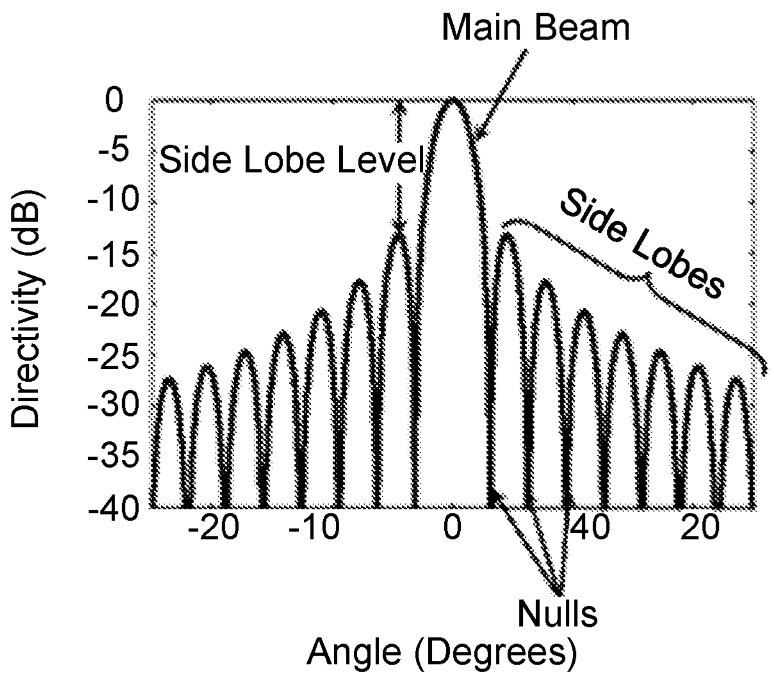
FIG. 1 schematically illustrates an example radiation pattern identifying the main lobe and side lobes.
Figure 2:
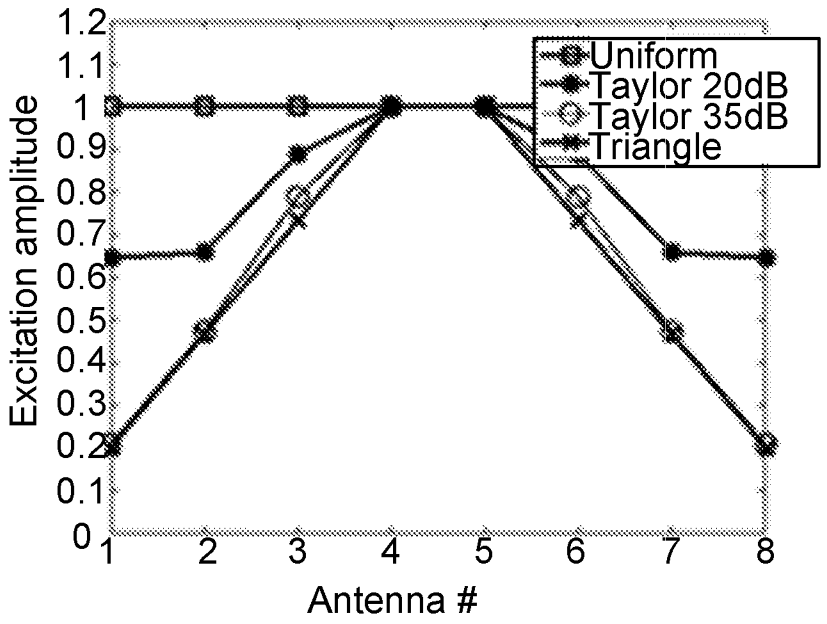
FIG. 2 schematically illustrates amplitude tapering applied to a 1-by-8 elements antenna array according to an example.
Figure 3:
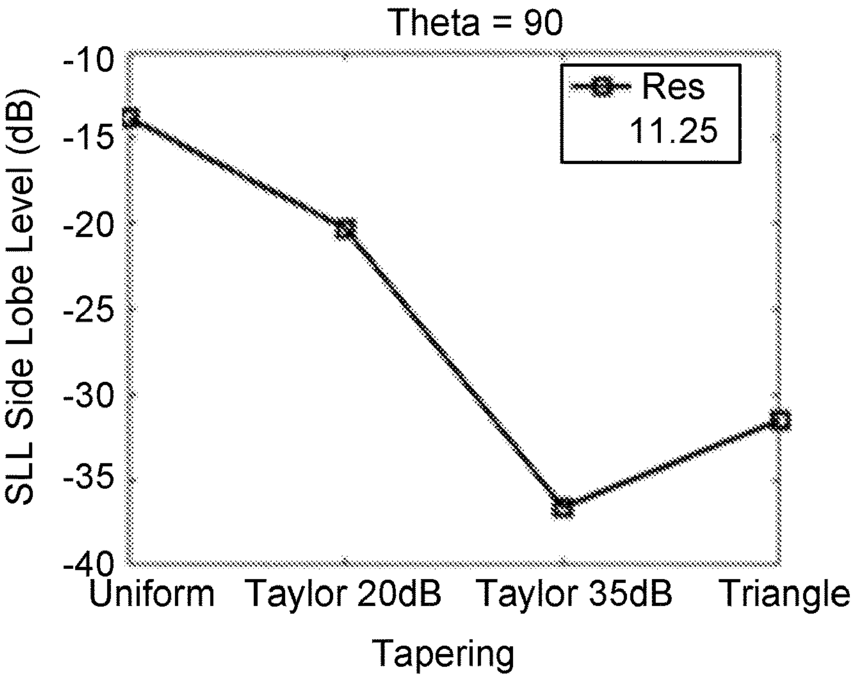
FIG. 3 schematically illustrates SLL for different types of amplitude tapering according to an example.
Figure 4:
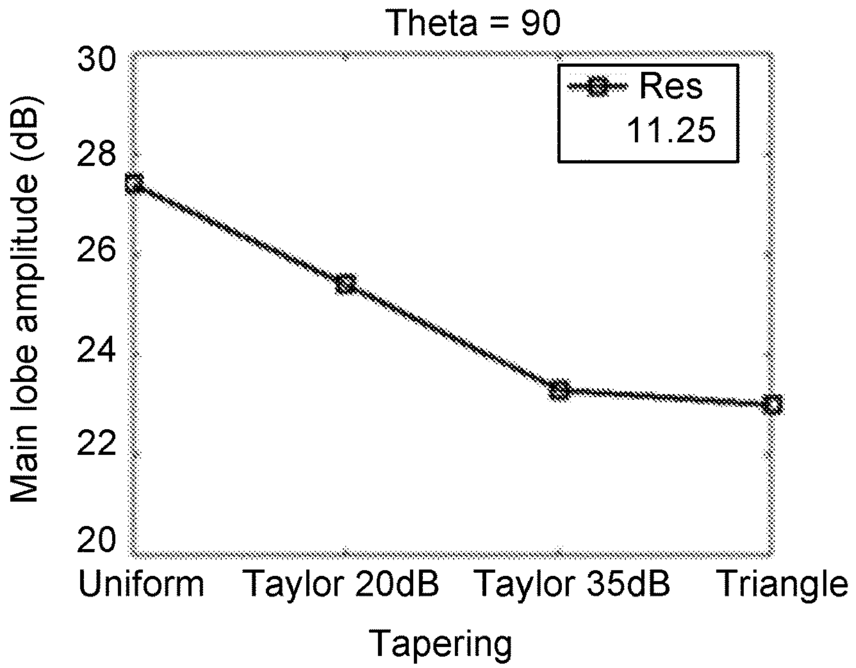
FIG. 4 schematically illustrates main lobe amplitude for different types of amplitude tapering according to an example.
Figure 5:
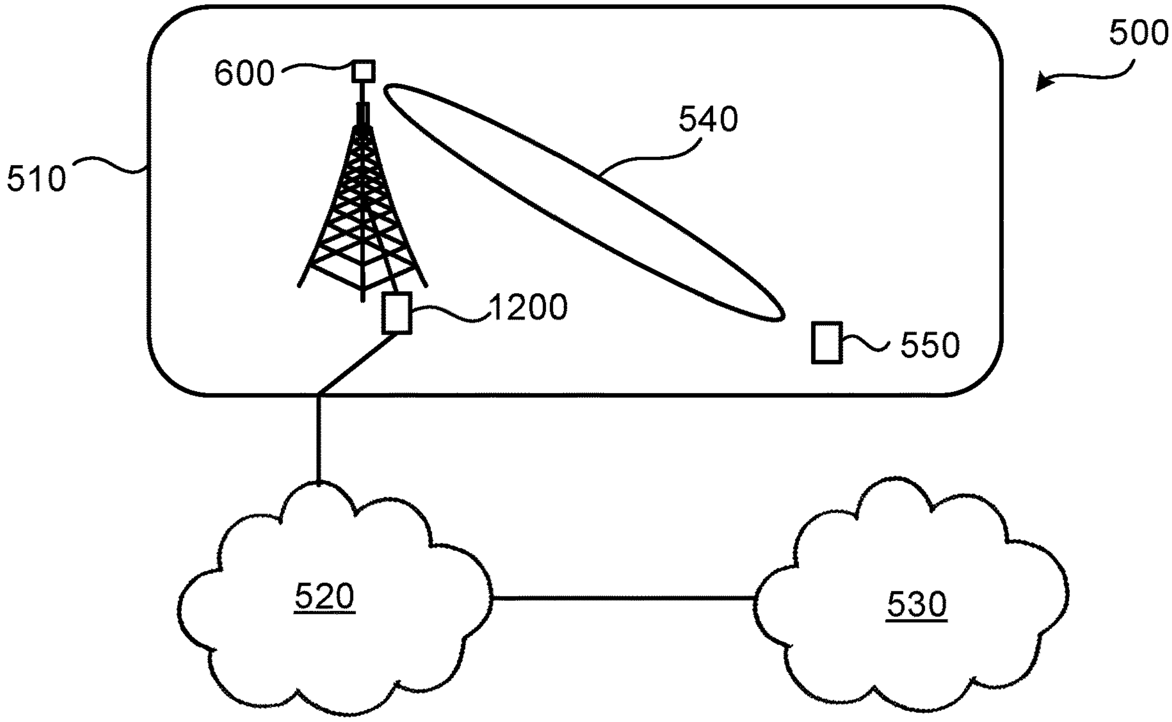
FIG. 5 is a schematic diagram illustrating a communication network according to embodiments.

FIG. 5 is a schematic diagram illustrating a communication network 500 where embodiments presented herein can be applied. The communication network 500 could be a third generation (3G) telecommunications network, a fourth generation (4G) telecommunications network, or a fifth (5G) telecommunications network and support any 3GPP telecommunications standard.

The communication network 500 comprises a transmission and reception point 600 configured to provide network access to user equipment 550 in an (radio) access network 510. The access network 510 is operatively connected to a core network 520. The core network 520 is in turn operatively connected to a service network 530, such as the Internet. The user equipment 550 is thereby, via the transmission and reception point 600, enabled to access services of, and exchange data with, the service network 530. The transmission and reception point 600 comprises an antenna array and is configured to use beam forming when communicating with the user equipment 550. In FIG. 5 this is illustrated by a beam 540 being used at the transmission and reception point 600. The beams could be used for either transmission only, or reception only, or for both transmission and reception.

Operation of the transmission and reception point 600 is controlled by a controller 1200. The controller 1200 might be part of, collocated with, or integrated with the transmission and reception point 600.

Examples of transmission and reception points 600 are (radio) access network nodes, radio base stations, base transceiver stations, Node Bs (NBs), evolved Node Bs (eNBs), gNBs, access points, access nodes, and integrated access and backhaul nodes.

Examples of user equipment 550 are wireless devices, mobile stations, mobile phones, handsets, wireless local loop phones, smartphones, laptop computers, tablet computers, network equipped sensors, network equipped vehicles, and so-called Internet of Things devices.

Figure 6:
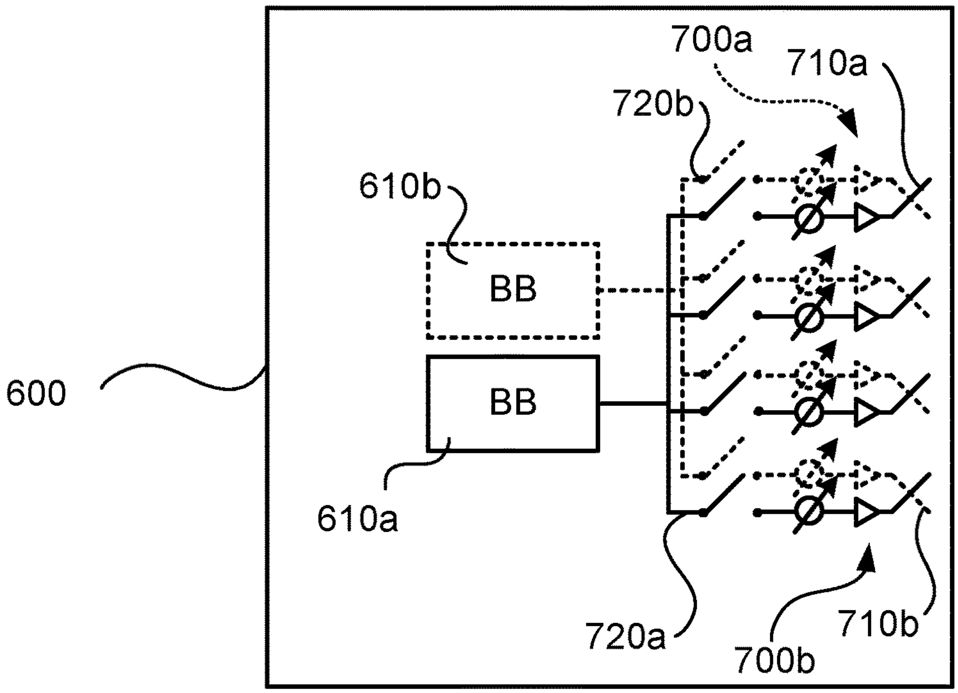
FIG. 6 schematically illustrates an example transmission and reception point comprising an antenna array.

FIG. 6 schematically illustrates an example transmission and reception point 600 comprising an antenna array 700*a*. In some embodiments, the antenna array 700*a* is thus part of the transmission and reception point 600 of the access network 510. However, the antenna array 700*a* might also be part of the user equipment 550. The antenna array 700*a* has four single polarized antenna elements 710*a* operatively connected to a distribution network 720*a* with one phase shifter and switch per antenna element 710*a*. In turn, the distribution network 720*a* is operatively connected to a baseband (BB) chain 610*a* of the transmission and reception point 600. A further antenna array 700*b* with single polarized antenna elements 710*b* and being operatively connected to a further baseband chain 61*ob* via its own distribution network 720*b* could be provided in order to enable communication using orthogonal polarization. Alternatively, each antenna element 710*a* is a dual-polarized antenna element. FIG. 6 illustrates an example of an antenna array 700*a*, 700*b* in the form of a uniform linear array. However, the antenna array 700*a*, 700*b* could also be a two-dimensional antenna array.

As noted above there is still a need for improved techniques for reducing the SLL of an antenna array 700*a*, 700*b*.

The embodiments disclosed herein therefore relate to mechanisms for operating an antenna array 700*a*, 700*b*. In order to obtain such mechanisms there is provided a controller 1200, a method performed by the controller 1200, a computer program product comprising code, for example in the form of a computer program, that when run on a controller 1200, causes the controller 1200 to perform the method.

Figure 7:
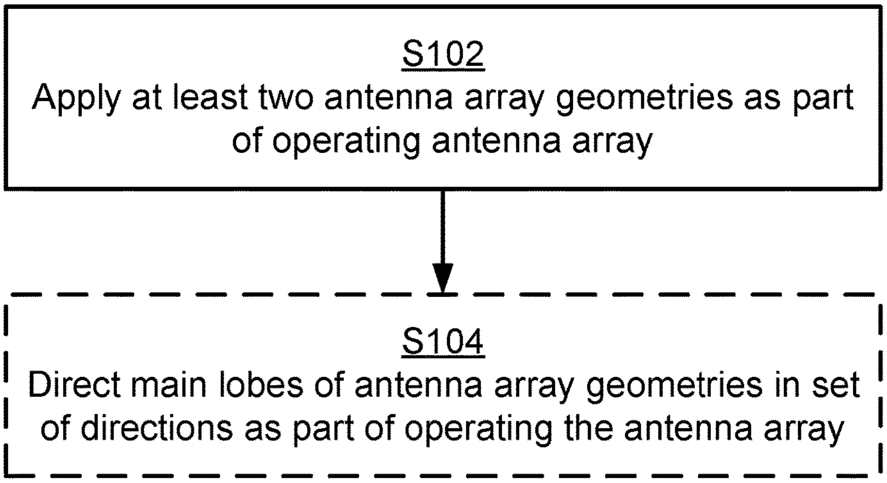
FIG. 7 and FIG. 10 are flowcharts of methods according to embodiments.

FIG. 7 is a flowchart illustrating embodiments of methods for operating an antenna array 700*a*, 700*b*. The antenna array 700*a*, 700*b* comprises antenna elements and has a reconfigurable antenna array geometry. The methods could be performed by the controller 1200. The methods are advantageously provided as computer programs 1420.

S102: As part of operating the antenna array 700*a*, 700*b* for performing wireless communication, at least two antenna array geometries are applied at the antenna array 700*a*, 700*b*.

The at least two antenna array geometries are alternatingly applied when the antenna array 700*a*, 700*b* is operated. In this respect, although there is a break, or service interruption, for example during the switch from one of the at least two antenna array geometries to another of the at least two antenna array geometries, operation of the antenna array 700*a*, 700*b* is still considered to be maintained. Each of the at least two antenna array geometries has a respective radiation pattern having a main lobe and a set of side lobes. The main lobes of all the radiation patterns have the same pointing direction. The pointing directions of the side lobes differ between the radiation patterns of the at least two antenna array geometries.

The geometry of the antenna array 700*a*, 700*b* is thus reconfigured to smear out the side lobes in different directions as the antenna array 700*a*, 700*b* is operated (either for transmission of a signal or reception of a signal). According to this method it is thus possible to smear out the side lobes, resulting in a lower SLL (when averaged over time) than per each individual antenna array geometry.

Embodiments relating to further details of operating an antenna array 700*a*, 700*b* as performed by the controller 1200 will now be disclosed.

Figure 8A:
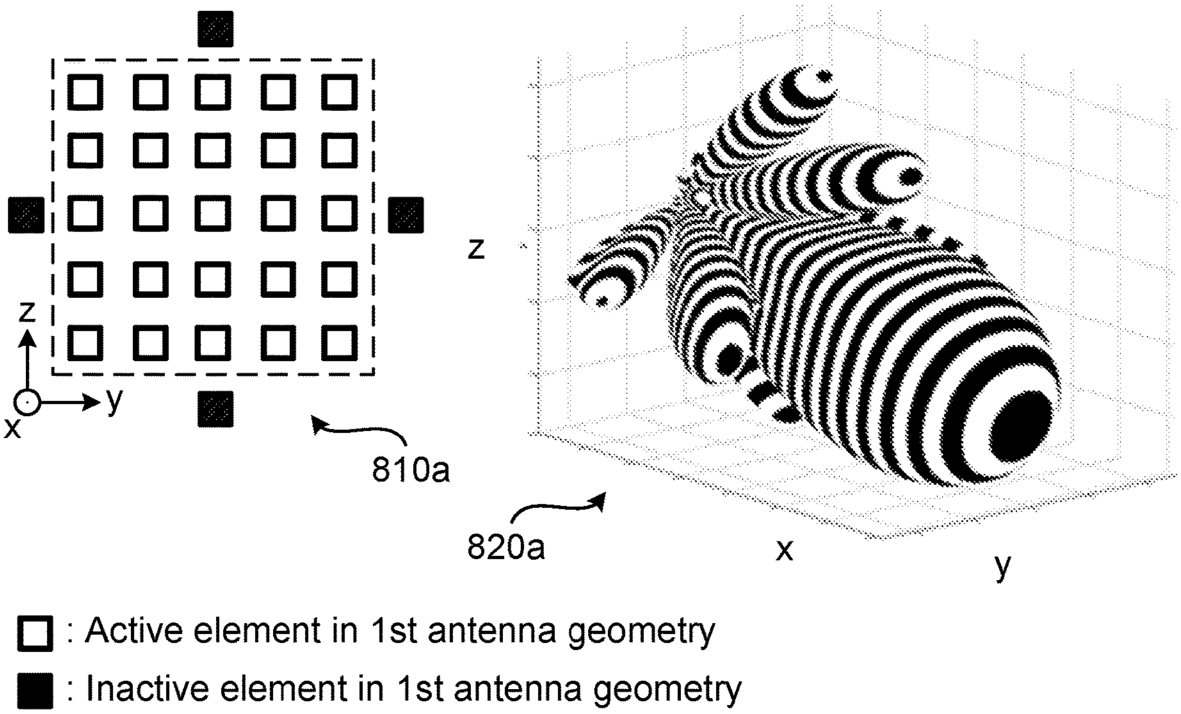
FIG. 8 schematically illustrates antenna array geometries and their corresponding radiation patterns according to an embodiment.
Figure 8B:
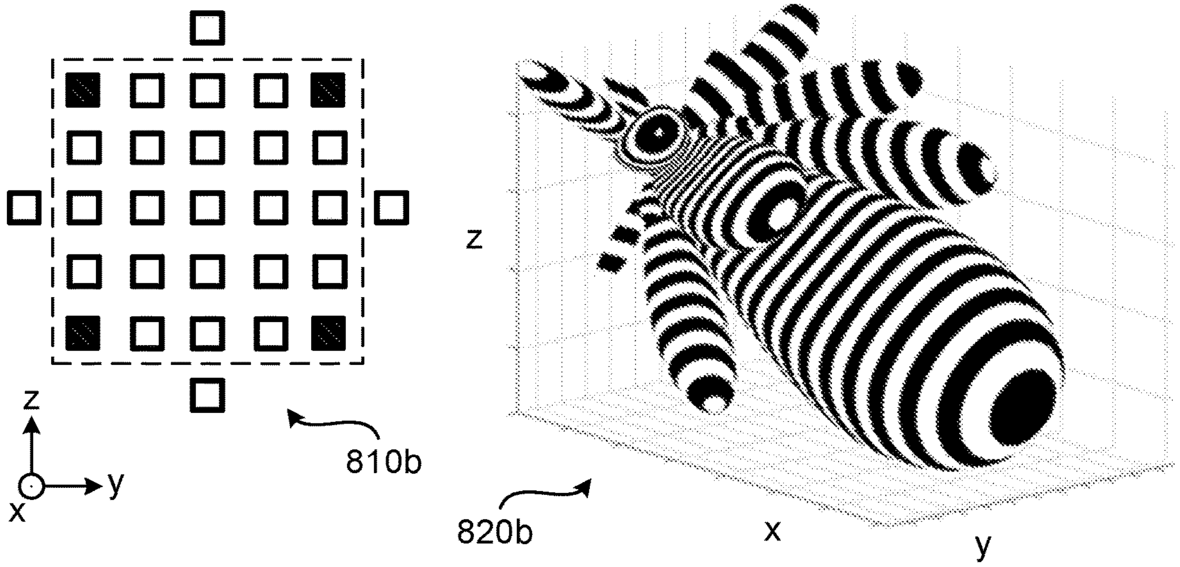
Figure 8C:
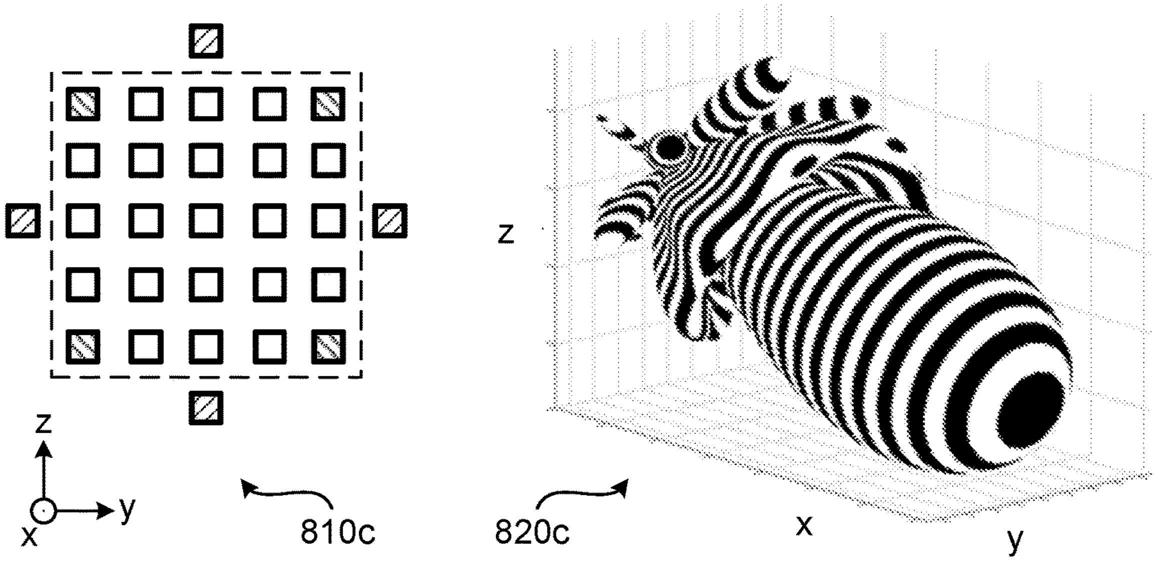

In some embodiments, when the antenna array 700*a*, 700*b* is operated, the pointing directions of the side lobes change over time by the pointing directions of the side lobes in the radiation patterns differing between the at least two antenna array geometries. Examples of antenna array geometries and corresponding radiation patterns are illustrated in FIG. 8, as will be described below.

In some aspects, the power consumption is the same for all the at least two antenna array geometries. That is, in some embodiments, all active antenna elements have same amplitude of excitation. However, there could be examples where amplitude tapering is applied as well, for example to further reduce the SLL.

Whereas phase weights or true time delays are applied to the different antenna elements of the antenna array 700*a*, 700*b* according to desired steering angle and antenna element position, there could be different relations between the antenna elements of the at least two different antenna array geometries. In some aspects, the phase weights remain the same for the antenna elements that have the same position in each of the at least two antenna array geometries. That is, in some embodiments, the phase weights of the antenna elements having the same position in each of the at least two antenna array geometries remain unchanged between the at least two antenna array geometries.

In some aspects, the application of the at least two different antenna array geometries over time is combined with beamforming, or beam steering. Hence, in some embodiments, the controller 1200 s configured to perform step S104:

S104: As part of operating the antenna array 700*a*, 700*b*, the main lobes of the at least two antenna array geometries are directed in a set of directions by beam steering being applied at the antenna array 700*a*, 700*b*.

Each of the at least two antenna array geometries might be applied when the main lobe is directed in each of the directions. An example of this will be disclosed below with reference to FIG. 11.

Reference is now made to FIG. 8 that illustrates antenna array geometries and their corresponding radiation patterns for an antenna array 700*a*, 700*b* having 29 antenna elements. For each antenna array geometry, white squares indicate active antenna elements and black squares indicate inactive antenna elements. 25 antenna elements are thus active in each antenna array geometry. The radiation patterns are illustrated in alternatingly black and white stripes for illustrative purposes only to illustrate the geometric shape of the radiation patterns and thus to increase the overall readability of the figures. The beam patterns are illustrated for a beam that is steered vertically by 15° (Phi=0, Theta=105). FIG. 8(*a*) illustrates a first antenna array geometry 810*a* and the corresponding radiation pattern 820*a*. The first antenna array geometry 810*a* represents a 5-by-5 antenna element square antenna array. FIG. 8(*b*) illustrates a second antenna array geometry 810*b* and the corresponding radiation pattern 820*b*. The second antenna array geometry 810*b* represents a rotated square (diamond) with the same number of active antenna elements as in the antenna array geometry 810*a* of FIG. 8(*a*). It can be observed that the main lobe amplitude for the beam pattern 820*b* is equal to the beam pattern 820*a*, but the side lobes point in respectively different directions for the different beam patterns 820*a*, 820*b*. FIG. 8(*c*) illustrates a combination 810*c* of the first antenna array geometry 810*a* and the second antenna array geometry 810*b* and the corresponding radiation pattern 820*c* which thus is a time-averaged (or time-multiplexed or duty-cycled) radiation pattern of the radiation patterns 820*a*, 820*b*. Whilst the main lobe amplitude for the beam pattern 820*c* is equal to the beam patterns 820*a*, 820*b*, the side lobes are smeared out. The SLL of the antenna pattern 820*c* is, for the present illustrative example, improved by 6.1 dB compared to the original antenna patterns 820*a*, 820*b*.

In a comparative example, a tapering Taylor window with −20 dB SLL as applied to the antenna array geometry 810*a* or 810*b* would imply a 3 dB loss in the main lobe. The cost of implementation to compensate for the main lobe reduction would be to increase the number of active antennas by 40%, resulting in 10 additional antenna elements (or two columns), adding to the overall power consumption. With the proposed technique, the SLL reaches-18.2 dB and the cost of implementation is only four additional antenna elements that are used for the diamond-shaped antenna array geometry 810_b_. Since the number of active antenna branches can be kept constant between the two antenna array geometries 810_a_, 810_b_, the power consumption of the antenna array is not impacted.

Figure 9:
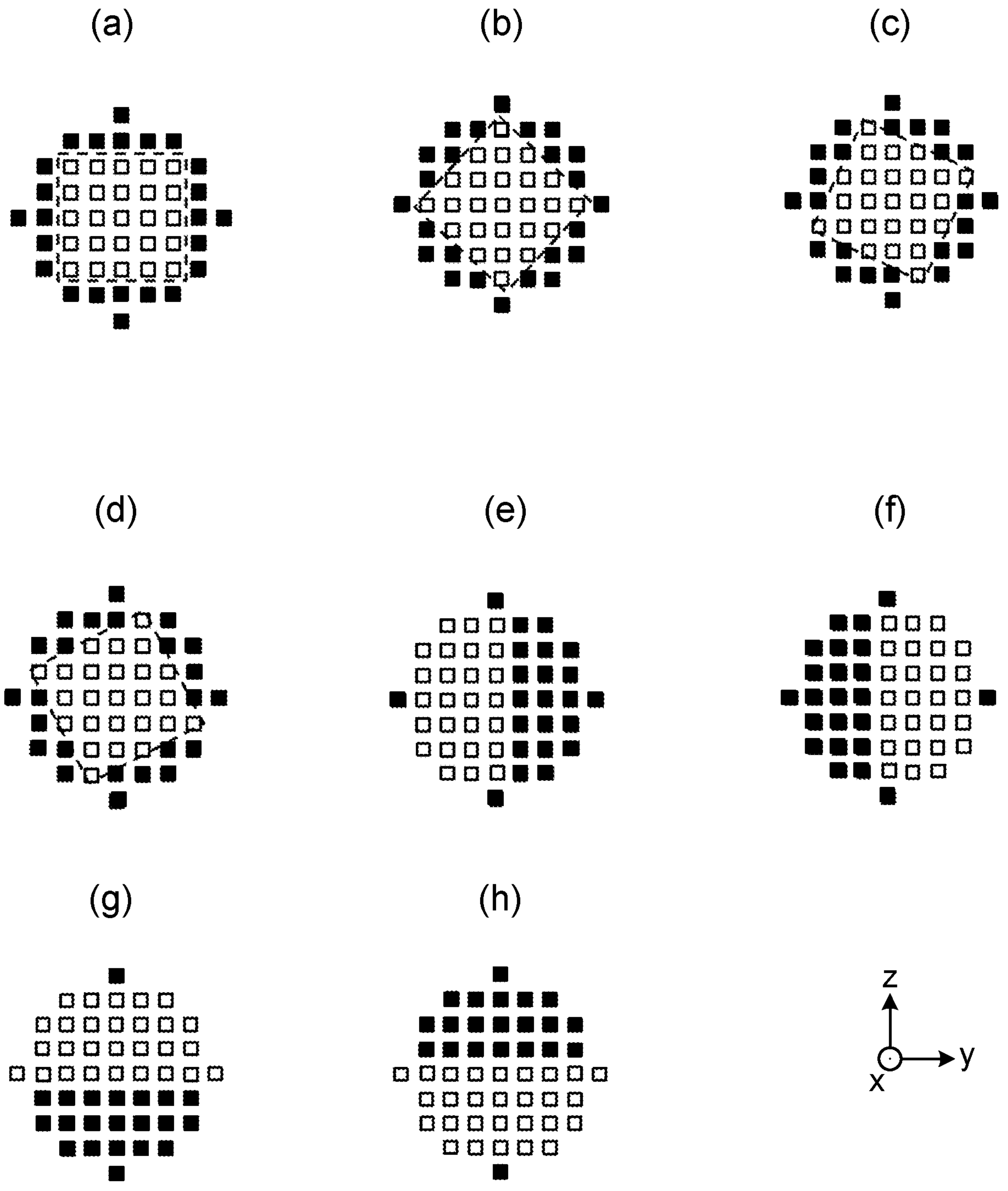
FIG. 9 schematically illustrates antenna array geometries for an antenna array according to an embodiment.

Although only two different geometries 810_a_, 810_b_ are shown in FIG. 8, the herein disclosed embodiments are not limited to selectively applying only two different geometries 810_a_, 801_b_. FIG. 9 at (a) to (h) schematically illustrates eight possible antenna array geometries for an antenna array comprising 49 antenna elements in total. For each antenna array geometry, white squares indicate active antenna elements and black squares indicate inactive antenna elements. About half of the antenna elements (25 or 26) are active in each antenna array geometry. For each antenna array geometry, the phase weights are calculated to steer the main lobe vertically by 15° (Theta=105). The antenna array geometries at (a) to (d) all yield the same main lobe whereas the antenna array geometries at (e) to (h) cause the main lobe (compared to the antenna array geometry e.g. at (a)) to be modified. The herein disclosed method can be applied such that at least two of the antenna array geometries of FIG. 8 are applied over time, with or without beamforming, or beam steering, as in step S104. While the amplitude of the main lobe is not impacted, the positions of the side lobes changes for each antenna pattern. Consequently, for a given side lobe angle, the measurement will be lower when the antenna array geometry is switched over time, because the measurements will be an average of each antenna pattern. Hence, the SLL decreases and radiation in unwanted directions is limited.

In some embodiments, all of the at least two antenna array geometries 810_a_:810_b_ have same constant number of active antenna elements. However, in other embodiments, as in the examples of FIG. 9, the number of active antenna elements differs between at least two of the at least two antenna array geometries.

There could be different ways to apply the at least two antenna array geometries 810_a_:810_b_ whilst operating the antenna array. In some aspects, each antenna array geometry is applied in turn, thus resulting in cycling between the at least two antenna array geometries 810_a_:810_b_. That is, in some embodiments, when the antenna array 700_a_, 700_b_ is operated, at least two of the at least two antenna array geometries 810_a_:810_b_ are cyclically applied. In some examples, the cycling is performed to take into account in which directions the unwanted side lobes should end up.

In some aspects, the reconfiguration of the antenna array geometries is performed to avoid radiation in specific directions. Assume for example that the position of a user equipment 500 that is intended to communicate with the antenna array 700_a_, 700_b_ (as in FIG. 5) is known. It could then be possible to select the at least two antenna array geometries so as to avoid side lobes pointing in a specific direction, e.g. the sky where transmission energy in a side lobe would be wasted or could cause interference to a satellite service, or a direction in which transmission energy in a side lobe could cause interference. In particular, in some embodiments, wireless communication is performed between the antenna array 700_a_, 700_b_ and a user equipment 550 located in a region, where also other objects are located in the region, and where which at least two antenna array geometries 810_a_:810_b_ that are applied depend on the location of the other objects in the region, or direction(s) in which transmission energy should be avoided, or minimized. In addition to reducing the transmissions in unwanted directions, this could also reduce the possibilities of eavesdropping attacks, i.e. scenarios where an attacker eavesdrops through side lobes to decode information transmitted in the main lobe. By adapting which antenna array geometries are used over time, the herein disclosed embodiments could also enable transmissions in certain directions to be avoided for specific time instants. For example, this could be achieved by selecting the at least two antenna array geometries from a pool of antenna array geometries, where each antenna array geometry has its own characteristics with respect to the side lobes. The at least two antenna array geometries could then be selected so that during specific time instants none of the antenna array geometries have side lobes in the certain directions, or at least such that the side lobes of the antenna array geometries causes the SLL in the certain directions to be reduced over time.

Figure 10:
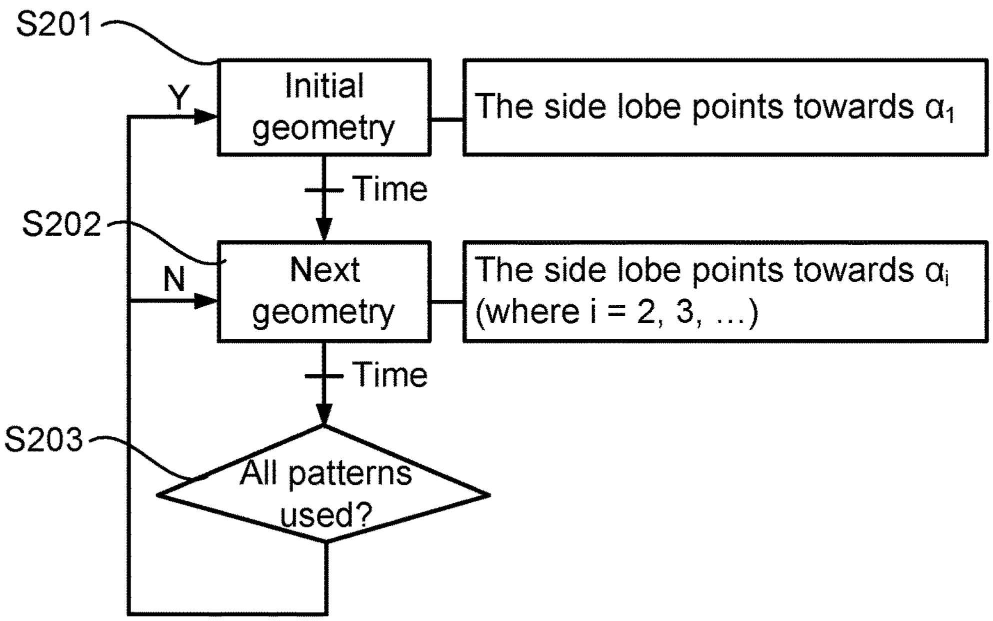

FIG. 10 is a flowchart illustrating how at least two different antenna array geometries can be applied over time, thus resulting in that the direction of the side lobes change over time, resulting in a decreased SLL when averaged over time. In FIG. 10 it is assumed that there are K>1 number of different antenna array geometries.

S201: The antenna array is operated (for transmission or reception) for some time duration whilst antenna array geometry i=1 is applied. The side lobes point in direction $\alpha_1$.

After some time duration a switch is made to the next antenna array geometry. That is, i:=i+1.

S202: The antenna array is operated (for transmission or reception) for some time duration whilst antenna array geometry i is applied. The side lobes point in direction $\alpha_i$.

S203: As check is made if all antenna array geometries have been cycled through. If i=K, then all antenna array geometries have been cycled through and step S201 is entered again. Else, step S202 is entered again with i:=i+1.

Figure 11:
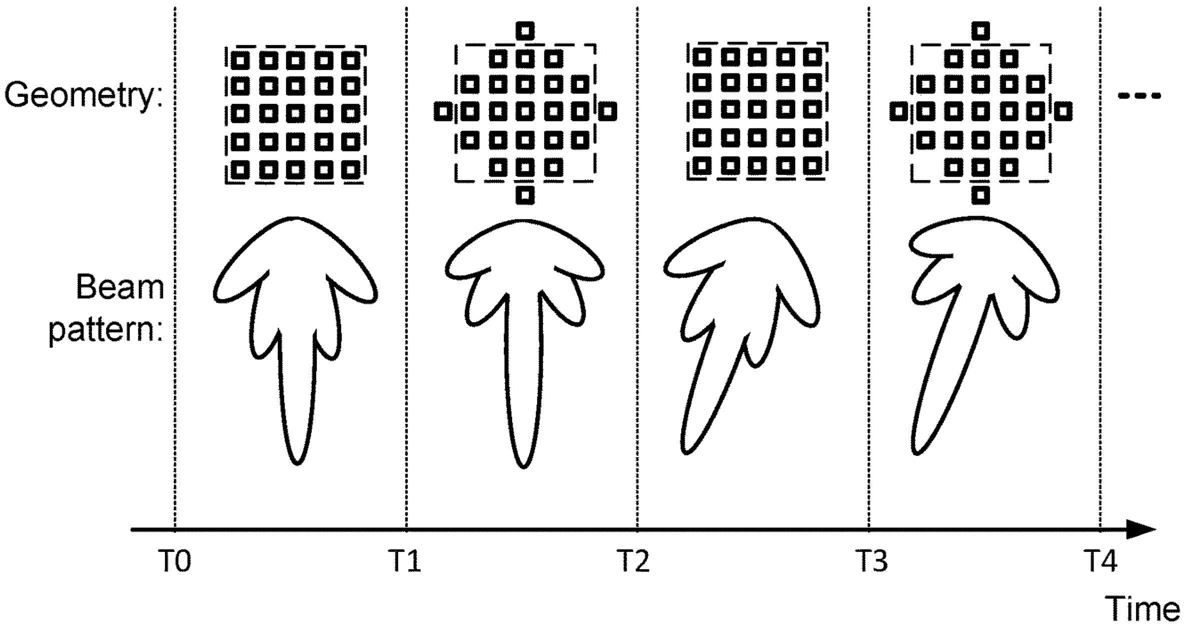
FIG. 11 schematically illustrates different antenna array geometries being applied over time according to an embodiment.

FIG. 11 schematically illustrates how different antenna array geometries are applied over time and also how the direction of the main lobe changes over time. From time T0 to time T1, a first antenna array geometry, having a first beam pattern, is applied for beamforming in a first direction. From time T1 to time T2, a second antenna array geometry, having a second beam pattern, is applied for beamforming also in the first direction. The main lobes of the two radiation patterns have the same pointing direction. The pointing directions of the side lobes differ between the radiation patterns of the two antenna array geometries. From time T2 to time T3, the first antenna array geometry, having the first beam pattern, is applied for beamforming in a second direction. From time T3 to time T4, the second antenna array geometry, having the second beam pattern, is applied for beamforming also in the second direction. It is noted that FIG. 11 illustrates a simplified scenario where only two different antenna array geometries are applied and where each of the two different antenna array geometries is applied only once in each direction. As the skilled person understands, the two different antenna array geometries could be cycled through a plurality of times before a switch of the direction of the main lobe is performed.

Figure 12:
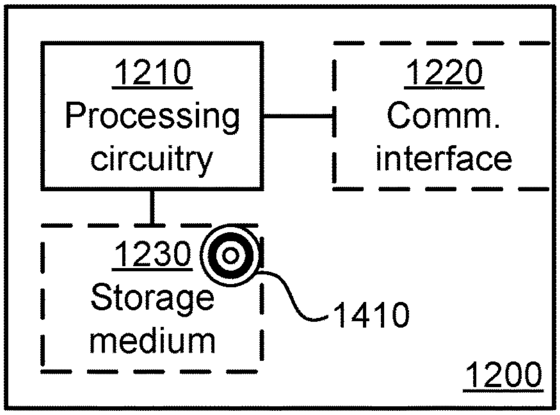
FIG. 12 is a schematic diagram showing functional units of a controller according to an embodiment.

FIG. 12 schematically illustrates, in terms of a number of functional units, the components of a controller 1200 according to an embodiment. Processing circuitry 1210 is provided using any combination of one or more of a suitable central processing unit (CPU), multiprocessor, microcontroller, digital signal processor (DSP), etc., capable of executing software instructions stored in a computer program product 1410 (as in FIG. 14), e.g. in the form of a storage medium 1230. The processing circuitry 1210 may further be provided as at least one application specific integrated circuit (ASIC), or field programmable gate array (FPGA).

Particularly, the processing circuitry 1210 is configured to cause the controller 1200 to perform a set of operations, or steps, as disclosed above. For example, the storage medium 1230 may store the set of operations, and the processing circuitry 1210 may be configured to retrieve the set of operations from the storage medium 1230 to cause the controller 1200 to perform the set of operations. The set of operations may be provided as a set of executable instructions.

Thus the processing circuitry 1210 is thereby arranged to execute methods as herein disclosed. The storage medium 1230 may also comprise persistent storage, which, for example, can be any single one or combination of magnetic memory, optical memory, solid state memory or even remotely mounted memory. The controller 1200 may further comprise a communications interface 1220 at least configured for communications with other entities, functions, nodes, and devices of the communication network 500, such as at least the antenna array 700*a*, 700*b*. As such the communications interface 1220 may comprise one or more transmitters and receivers, comprising analogue and digital components. In some aspects the communications interface 1220 comprises the antenna array 700*a*, 700*b*. The processing circuitry 1210 controls the general operation of the controller 1200 e.g. by sending data and control signals to the communications interface 1220 and the storage medium 1230, by receiving data and reports from the communications interface 1220, and by retrieving data and instructions from the storage medium 1230. Other components, as well as the related functionality, of the controller 1200 are omitted in order not to obscure the concepts presented herein.

Figure 13:
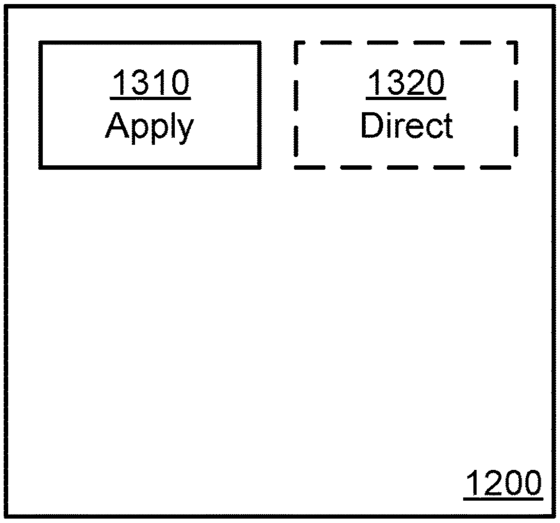
FIG. 13 is a schematic diagram showing functional modules of a controller according to an embodiment.

FIG. 13 schematically illustrates, in terms of a number of functional modules, the components of a controller 1200 according to an embodiment. The controller 1200 of FIG. 13 comprises an apply module 1310 configured to perform step S102. The controller 1200 of FIG. 13 may further comprise a number of optional functional modules, such as a direct module 1320 configured to perform step S104. In general terms, each functional module 1310:1320 may in one embodiment be implemented only in hardware and in another embodiment with the help of software, i.e., the latter embodiment having computer program instructions stored on the storage medium 1230 which when run on the processing circuitry makes the controller 1200 perform the corresponding steps mentioned above in conjunction with FIG. 13. It should also be mentioned that even though the modules correspond to parts of a computer program, they do not need to be separate modules therein, but the way in which they are implemented in software is dependent on the programming language used. Preferably, one or more or all functional modules 1310:1320 may be implemented by the processing circuitry 1210, possibly in cooperation with the communications interface 1220 and/or the storage medium 1230. The processing circuitry 1210 may thus be configured to from the storage medium 1230 fetch instructions as provided by a functional module 1310:1320 and to execute these instructions, thereby performing any steps as disclosed herein.

The controller 1200 may be provided as a standalone device or as a part of at least one further device. For example, the controller 1200 may be provided in a node of the radio access network or in a node of the core network. Alternatively, functionality of the controller 1200 may be distributed between at least two devices, or nodes. These at least two nodes, or devices, may either be part of the same network part (such as the radio access network or the core network) or may be spread between at least two such network parts. In general terms, instructions that are required to be performed in real time may be performed in a device, or node, operatively closer to the cell than instructions that are not required to be performed in real time.

Thus, a first portion of the instructions performed by the controller 1200 may be executed in a first device, and a second portion of the of the instructions performed by the controller 1200 may be executed in a second device; the herein disclosed embodiments are not limited to any particular number of devices on which the instructions performed by the controller 1200 may be executed. Hence, the methods according to the herein disclosed embodiments are suitable to be performed by a controller 1200 residing in a cloud computational environment. Therefore, although a single processing circuitry 1210 is illustrated in FIG. 12 the processing circuitry 1210 may be distributed among a plurality of devices, or nodes. The same applies to the functional modules 1310:1320 of FIG. 13 and the computer program 1420 of FIG. 14.

Figure 14:
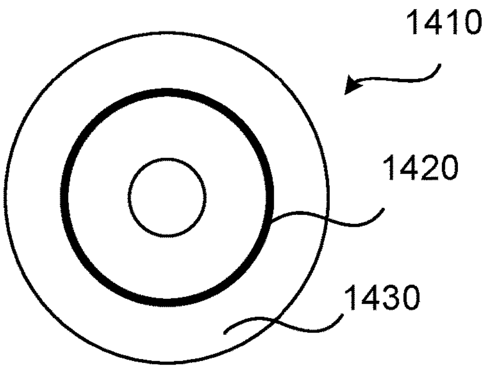
FIG. 14 shows one example of a computer program product comprising computer readable storage medium according to an embodiment.

FIG. 14 shows one example of a computer program product 1410 comprising computer readable storage medium 1430. On this computer readable storage medium 1430, a computer program 1420 can be stored, which computer program 1420 can cause the processing circuitry 1210 and thereto operatively coupled entities and devices, such as the communications interface 1220 and the storage medium 1230, to execute methods according to embodiments described herein. The computer program 1420 and/or computer program product 1410 may thus provide means for performing any steps as herein disclosed.

In the example of FIG. 14, the computer program product 1410 is illustrated as an optical disc, such as a CD (compact disc) or a DVD (digital versatile disc) or a Blu-Ray disc. The computer program product 1410 could also be embodied as a memory, such as a random access memory (RAM), a read-only memory (ROM), an erasable programmable read-only memory (EPROM), or an electrically erasable programmable read-only memory (EEPROM) and more particularly as a non-volatile storage medium of a device in an external memory such as a USB (Universal Serial Bus) memory or a Flash memory, such as a compact Flash memory. Thus, while the computer program 1420 is here schematically shown as a track on the depicted optical disk, the computer program 1420 can be stored in any way which is suitable for the computer program product 1410.

The inventive concept has mainly been described above with reference to a few embodiments. However, as is readily appreciated by a person skilled in the art, other embodiments than the ones disclosed above are equally possible within the scope of the inventive concept, as defined by the appended patent claims.

The invention claimed is:

1. A method for operating an antenna array, the antenna array comprising antenna elements and having a reconfigurable antenna array geometry, the method comprising:

applying, as part of operating the antenna array for performing wireless communication, at least two antenna array geometries at the antenna array in which:

(i) the at least two antenna array geometries are alternatingly applied when the antenna array is operated, at least two of the at least two antenna array geometries being cyclically applied when the antenna array is operated, the cycling arranged to avoid having a side lobe positioned in at least one radiation direction;

(ii) each of the at least two antenna array geometries has a respective radiation pattern having a main lobe and a set of side lobes;

(iii) the main lobes of all the radiation patterns have same pointing direction; and (iv) pointing directions of the side lobes differ between the radiation patterns of the at least two antenna array geometries.

2. The method according to claim 1, wherein all of the at least two antenna array geometries have same constant number of active antenna elements.

3. The method according to claim 1, wherein, when the antenna array is operated, the pointing directions of the side lobes change over time by the pointing directions of the side lobes in the radiation patterns differing between the at least two antenna array geometries.

4. The method according to claim 1, wherein all active antenna elements have same amplitude of excitation.

5. The method according to claim 1, wherein phase weights of the antenna elements having same position in each of the at least two antenna array geometries remain unchanged between the at least two antenna array geometries.

6. The method according to claim 1, wherein wireless communication is performed between the antenna array and a user equipment located in a region, wherein also other objects are located in the region, and wherein which at least two antenna array geometries that are applied depend on location of the other objects in the region.

7. The method according to claim 1, wherein the method further comprises:

directing, as part of operating the antenna array, the main lobes of the at least two antenna array geometries in a set of directions by applying beam steering at the antenna array.

8. The method according to claim 7, wherein each of the at least two antenna array geometries are applied when the main lobe is directed in each of the directions.

9. The method according to claim 1, wherein the antenna array is a two-dimensional antenna array.

10. The method according to claim 1, wherein the antenna array is part of a transmission and reception point of an access network.

11. The method according to claim 1, wherein the method is performed by a controller of the antenna array.

12. A controller for operating an antenna array, the antenna array comprising antenna elements and having a reconfigurable antenna array geometry, the controller comprising processing circuitry, the processing circuitry being configured to cause the controller to:

apply, as part of operating the antenna array for performing wireless communication, at least two antenna array geometries at the antenna array in which:

(i) the at least two antenna array geometries are alternatingly applied when the antenna array is operated, at least two of the at least two antenna array geometries being cyclically applied when the antenna array is operated, the cycling arranged to avoid having a side lobe positioned in at least one radiation direction;

(ii) each of the at least two antenna array geometries has a respective radiation pattern having a main lobe and a set of side lobes;

(iii) the main lobes of all the radiation patterns have same pointing direction; and (iv) pointing directions of the side lobes differ between the radiation patterns of the at least two antenna array geometries.

13. The controller according to claim 12, wherein all of the at least two antenna array geometries have same constant number of active antenna elements.

14. The controller according to claim 12, wherein, when the antenna array is operated, the pointing directions of the side lobes change over time by the pointing directions of the side lobes in the radiation patterns differing between the at least two antenna array geometries.

15. The controller according to claim 12, wherein all active antenna elements have same amplitude of excitation.

16. The controller according to claim 12, wherein phase weights of the antenna elements having same position in each of the at least two antenna array geometries remain unchanged between the at least two antenna array geometries.

17. The controller according to claim 12, wherein wireless communication is performed between the antenna array and a user equipment located in a region, wherein also other objects are located in the region, and wherein which at least two antenna array geometries that are applied depend on location of the other objects in the region.

18. A controller for operating an antenna array, the antenna array comprising antenna elements and having a reconfigurable antenna array geometry, the controller comprising:

an apply module configured to apply, as part of operating the antenna array for performing wireless communication, at least two antenna array geometries at the antenna array in which:

(i) the at least two antenna array geometries are alternatingly applied when the antenna array is operated, at least two of the at least two antenna array geometries being cyclically applied when the antenna array is operated, the cycling arranged to avoid having a side lobe positioned in at least one radiation direction;

(ii) each of the at least two antenna array geometries has a respective radiation pattern having a main lobe and a set of side lobes;

(iii) the main lobes of all the radiation patterns have same pointing direction; and (iv) pointing directions of the side lobes differ between the radiation patterns of the at least two antenna array geometries.

* * * * *